Aug. 18, 1970   J. C. HOBBS   3,524,532

ELEVATOR STRUCTURE HAVING CHAIN DRIVEN RECIPROCATING PLATES

Filed Sept. 17, 1968   2 Sheets-Sheet 1

INVENTOR.
JAMES C. HOBBS
BY
Barnes, Kisselle, Raisch & Choate
ATTORNEYS

Aug. 18, 1970          J. C. HOBBS          3,524,532
ELEVATOR STRUCTURE HAVING CHAIN DRIVEN RECIPROCATING PLATES
Filed Sept. 17, 1968                    2 Sheets-Sheet 2

INVENTOR.
JAMES C. HOBBS
BY
Barnes, Kisselle, Raisch & Choate
ATTORNEYS

United States Patent Office 3,524,532
Patented Aug. 18, 1970

3,524,532
ELEVATOR STRUCTURE HAVING CHAIN
DRIVEN RECIPROCATING PLATES
James C. Hobbs, Livonia, Mich., assignor to Can-Eng
Holdings Ltd., Niagara Falls, Ontario, Canada, a corporation of Canada
Filed Sept. 17, 1968, Ser. No. 760,175
Int. Cl. B65g 25/04
U.S. Cl. 198—218        14 Claims

ABSTRACT OF THE DISCLOSURE

An elevator having a series of juxtaposed plates arrayed between a receiving location and an elevated delivery location is driven by a pair of endless sinuous chains having successive runs secured to opposite sides of successive plates. The runs are adjustable in length to adjust the positions of said plates. The chains are driven alternately in opposite directions by a reversible motor for reciprocating the plates alternately in opposite directions to elevate articles step by step upwardly to said delivery location.

---

This invention relates generally to an elevator of the type which utilizes a series of juxtaposed plates arrayed between a receiving location and an elevated delivery location, the plates being reciprocable in alternately opposite directions for elevating articles step by step from the receiving location to the delivery location. An elevator of this type is disclosed in U.S. Pat. No. 3,265,195. More particularly, the invention relates to a drive mechanism for the elevator plates.

As is shown in the above-mentioned patent, it is conventional to reciprocate the plates of such an elevator by means of a series of screw shafts rotated in alternately opposite directions by interposed gearing, a nut on each screw shaft being secured to one of the reciprocating plates. Such a drive mechanism is very effective, particularly where a large speed reduction is required between the drive motor and the reciprocating plates.

However, drive mechanisms of this type have a disadvantage in that they are relatively expensive both to build and to maintain. The maintenance expense arises particularly when the mechanism is used to elevate relatively heavy loads. The loads are supported by thrust bearings on which the screw shafts operate. The standard thrust bearings for such screw shafts wear quickly under relatively heavy loads and must be replaced. This necessitates not only the provision of new thrust bearings but the cost of extensive disassembly and reassembly procedures and attendant costly down time.

The object of the present invention is to provide for such an elevator a relatively simple drive mechanism which is improved in that it is relatively inexpensive to build and further improved so that the elevator can be used over long periods of time elevating relatively heavy loads with minimal maintenance requirements.

In general, the invention is carried out by providing a pair of chains at opposite sides of the reciprocating plates. The chains are entrained around sprockets so that they have sinuous form with successive runs extending substantially parallel to the direction of movement of the plates. The successive runs are secured respectively to successive ones of the plates so that when the chains are driven in opposite directions by a reversible motor the plates reciprocate alternately in opposite directions. The runs of the chains are adjustable in length to adjust the relative positions of the plates and also to adjust the orientation of each individual plate with respect to its direction of travel. One form of the invention is shown in the accompanying drawings.

Figure 1:
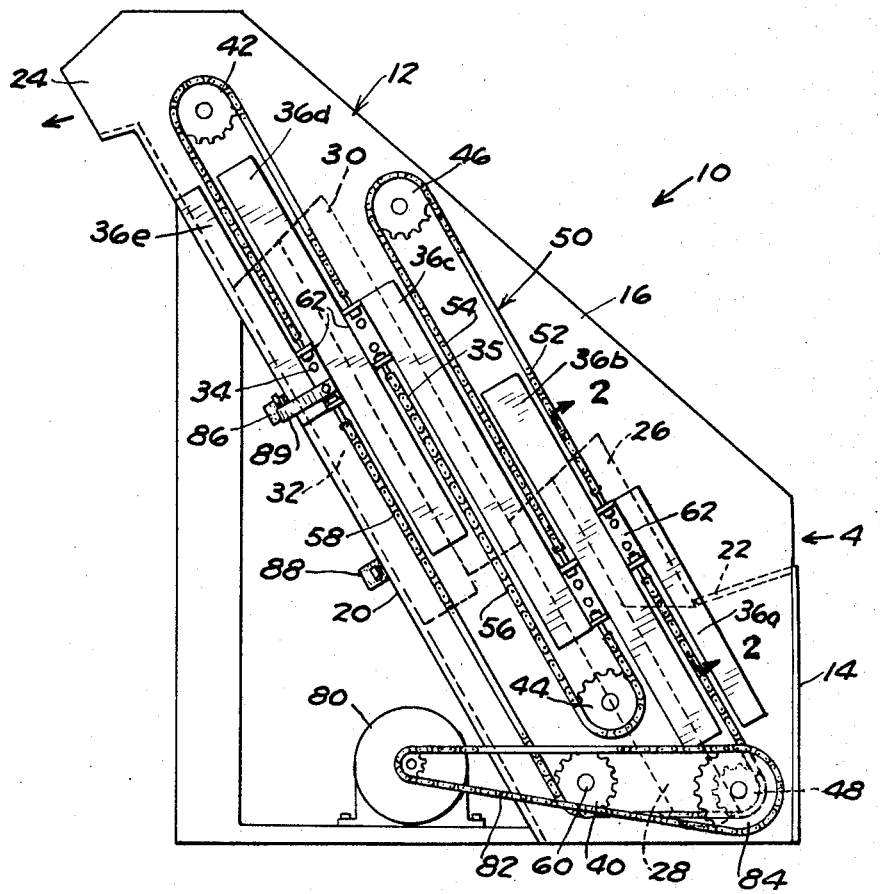
FIG. 1 is a partly diagrammatic side elevational view of an elevator incorporating the present invention.

Shown in the drawings is an elevator 10 embodying the present invention. The elevator includes a housing 12 having a front member 14, side members 16, 18 and a sloped back member 20. The housing defines an inlet chute 22 at a lower frontal location through which articles A are received and an upper rearwardly disposed outlet chute 24 through which the elevated articles are delivered.

A series of juxtaposed elevator plates 26, 28, 30, 32, is arrayed between receiving chute 22 and delivery chute 24. The plates are reciprocable in housing 12 in a sloped direction as illustrated. The plates are laterally contained and guided by sides 16, 18 of housing 12. A guide block 33 is secured to each side edge of each plate as by bolts 34. The blocks project outwardly through slots 35 (FIGS. 1 and 2) in side walls 16, 18 for sliding, guided engagement between guide rails 36a–e mounted on the outer faces of sides 16, 18 and extending in the direction of movement of plates 26–32. The guide blocks and guide rails cooperate to guide the plates longitudinally. Slots 35 accommodate movement of blocks 33 when the plates are reciprocated.

A series of sprocket wheels 40–48 is mounted on the outer side of housing member 16 and a correspondingly positioned series of sprocket wheels 40–48 is mounted on the outer side of housing member 18. An endless chain 50 illustrated as being of the roller type is entrained around each series of sprocket wheels. The sprocket wheels are positioned so that the portions of the chain extending therebetween form runs 52–58 which extend adjacent and parallel to the side edges of plates 26–32, respectively. The two sprocket wheels 40 are drivingly interconnected by a cross shaft 60.

Figure 2:
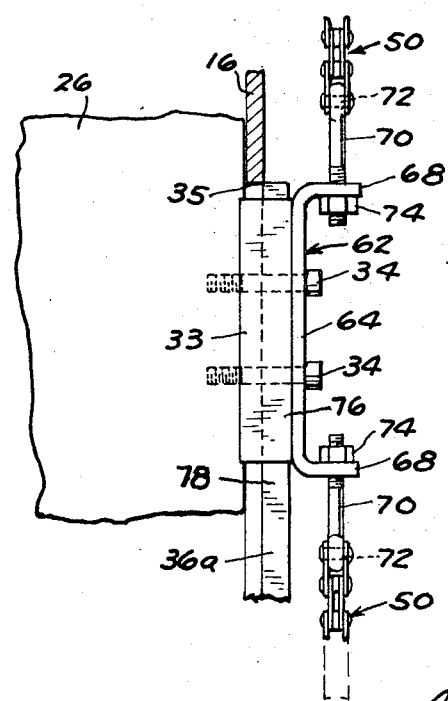
FIG. 2 is an enlarged scale sectional view on line 2—2 of FIG. 1.

Each chain run 52–58 is provided with a link 62 by means of which it is secured to its respective reciprocating plate 26–32. In the structure illustrated, link 62 is U-shaped, having a base portion 64 anchored to the guide block 33 for the adjacent reciprocating plate by bolts 34, as illustrated in FIG. 2. Each link 62 has legs 68 apertured to receive the threaded end of a bolt 70 attached to an adjacent portion of chain 50 by suitable means such as a pin and eye connection 72. A nut 74 is threaded onto each bolt 70 inwardly of leg 68.

Chains 50 are driven by a reversible motor 80 through a sprocket-driven chain 82 which in turn drives a sprocket wheel 84 having a driving connection with one of the sprocket wheels (e.g., wheel 48) around which one of the chains 50 is entrained. If required, a speed reduction unit (not shown) may be interposed between motor 80 and the driven sprocket wheel. The direction of motor 80 is reversed by suitable means such as limit switches 86 and 88 actuated by a finger 89 carried by plate 32 as the plate moves to its upward and downward positions.

Figure 3:
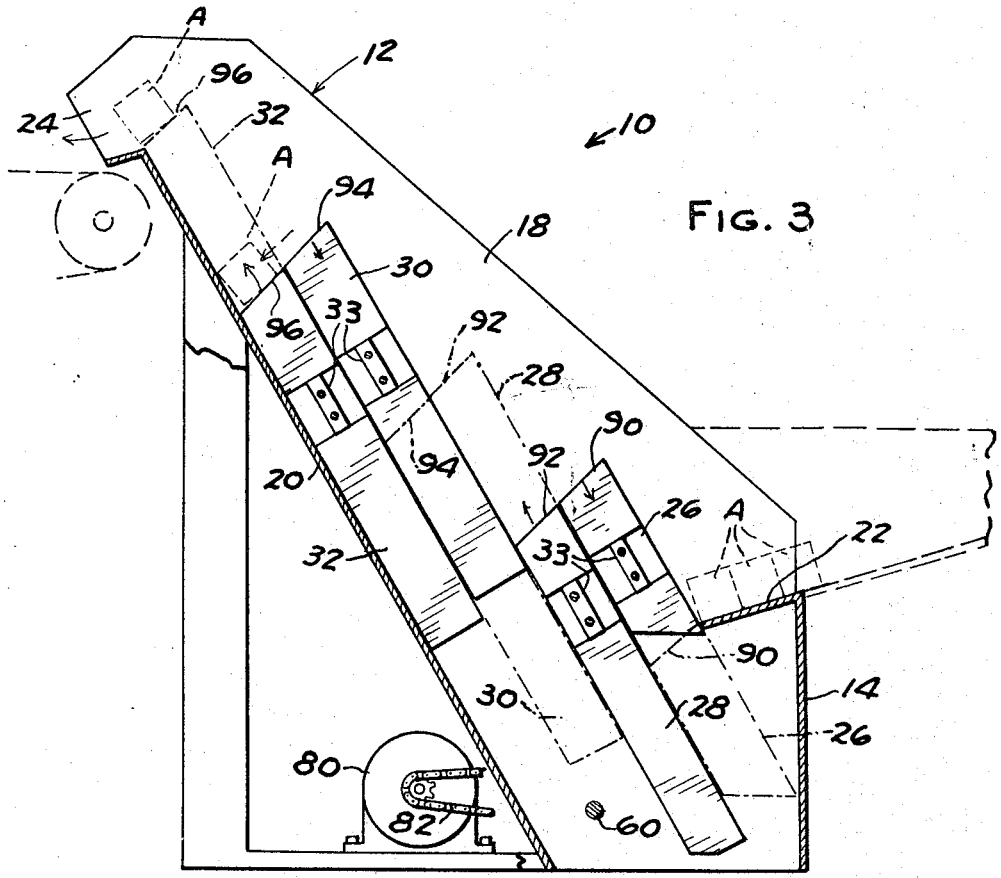
FIG. 3 is a side view partly in vertical section of the elevator shown in FIG. 1.
Figure 4:
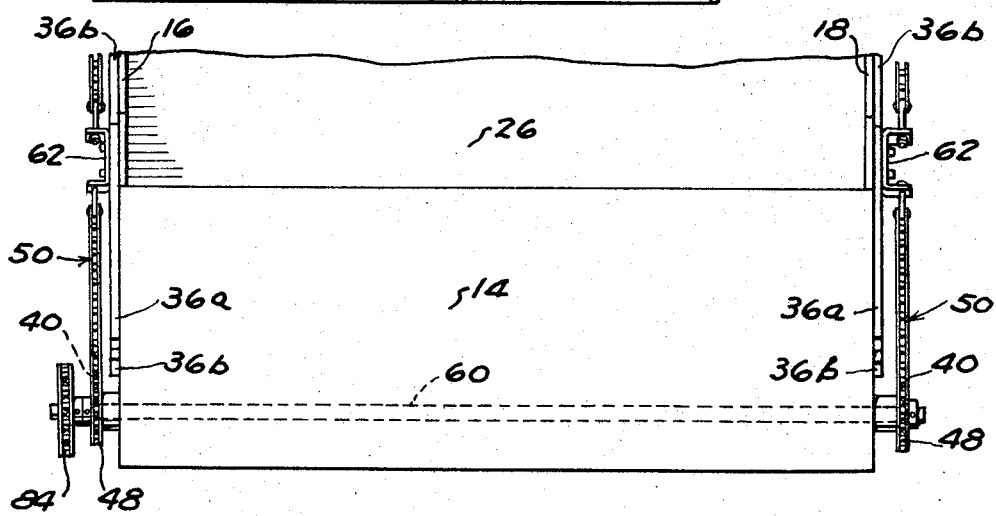
FIG. 4 is a fragmentary front elevational view looking in the direction of arrow 4 in FIG. 1.

In use, it may be assumed that elevator plates 26–32 are in the solid-line position illustrated in FIG. 3 and that a supply of articles A has been introduced from a source into chute 24. The lead articles in the chute slide downwardly to the left as the drawing is viewed into engagement with the upwardly disposed surface of elevator plate 26. Plates 26 and 30 are in their upward position and plates 28 and 32 are in their downward position. Motor 80 is actuated to drive sprocket wheels 84 and 48 clockwise as the drawings are viewed and this causes chain runs 52 and 56 to move downwardly while chain runs 54 and 58 move upwardly. This movement of the chain runs lowers elevator plates 26 and 30 and carries elevator plates 28 and 32 upwardly until the various plates reach the dotted-line positions thereof shown in FIG. 3.

At this time, the forward or lowermost articles A in chute 24 drop onto the top edge 90 of elevator plate 26; also, finger 89 on elevator plate 32 trips limit switch 88 which reverses the direction of motor 80. Thereupon, the direction of movement of the various chain runs reverses, and the elevator plates are returned to their solid-line position of FIG. 3. The articles A which were carried upwardly by the top edge 90 of plate 26 drop onto the top edge 92 of elevator plate 28. At this time, finger 89 trips limit switch 86 which again reverses the direction of motor 80, thereby reciprocating the elevator plates once again to their dotted-line position, whereupon the articles A which have been elevated by the top edge 92 of plate 28 drop onto the top edge 94 of plate 30.

Upon further cycles of reciprocation in the manner described, articles A are successively carried upwardly by edge 94 and the top edge 96 of plate 32 to the dotted-line position thereof where they slide off for delivery through outlet chute 24. Upon each downward reciprocation of elevator plate 26, it receives a new group of articles A, and these articles are elevated step by step in the manner described and ultimately delivered through the outlet chute.

The weight of the elevator plates and the articles A being elevated thereby is carried in part by guide rails 36b–e and in part by the various runs of chain 50. The relative positions of the elevator plates in their direction of travel are adjustable to cause adjacent ones of top edges 90–96 to align with one another to insure transfer of articles A from one top edge to the next as the articles are elevated. The adjustment is accomplished by turning nuts 74 on bolts 70, thereby adjusting the positions of links 62 in the various chain runs 52–58. The positions of the elevator plates are thereby in turn adjusted with respect to the longitudinal extent of the chain runs and with respect to each other. The lateral angular disposition of each individual elevator plate is adjusted by manipulation of nuts 74 on the two links 62 secured thereto. The tension of chains 50 is also adjustable by manipulation of nuts 74.

The drive structure is very inexpensive to build and to install. It is capable of operation over long periods of time in elevating relatively heavy loads. Nevertheless, the components of the mechanism experience little wear, and the necessity for maintenance and replacement of components is minimal.

What is claimed is:

1. In an elevator having a series of juxtaposed plates arrayed between a receiving location and an elevated delivery location and being reciprocable in alternately opposite directions for elevating articles step by step to said delivery location, improved drive structure for said plates which comprises,
   a flexible sinuous element having a series of interconnected runs,
   successive ones of said runs being disposed adjacent successive ones of said plates and extending generally parallel to the direction of movement thereof,
   means connecting said runs respectively with said plates,
   and reversible motor means operably connected with said element for reciprocating said runs alternately in opposite directions.

2. The structure defined in claim 1 wherein said element is endless, the first and last of said runs being interconnected.

3. The structure defined in claim 1 wherein the portions of said element which interconnect said runs are entrained around wheels and said runs are substantially parallel to each other.

4. The structure defined in claim 1 wherein said plates have side edges, said runs extending substantially parallel to and adjacent said edges.

5. The structure defined in claim 1 wherein said connecting means comprises a link in each of said runs secured to its respective plate and adjustment means operable to adjust the position of each link relative to adjacent portions of its respective run and in the direction of extent thereof, whereby to adjust the relative positions of said plates in said directions.

6. The structure defined in claim 5 wherein said adjustment means is operable to adjust the distance between the portions of said element adjacent said links, whereby to adjust the tension of said element.

7. The structure defined in claim 1 wherein said plates have first side portions and second side portions, a first said element being so disposed and connected with said first side portions, a second said element being so disposed and connected with said second side portions, said motor means being so connected with said first and second elements.

8. The structure defined in claim 1 wherein said plates have edges at their opposite sides,
   there being two of said elements each of which comprises an endless chain, the portions of said chain interconnecting said runs being entrained around sprocket wheels,
   the runs of one element being substantially parallel to and adjacent the edges of said plates at one side thereof, the runs of the other element being substantially parallel to and adjacent the edges of said plates at the other side thereof,
   said connecting means comprising a link in each run secured to an edge of its respective plate,
   adjustment means between each link and adjacent portions in its respective run,
   said adjustment means being operable to adjust the position of each link longitudinally with respect to adjacent portions of its respective run, whereby to adjust the relative positions of said plates in their direction of travel and to effect angular adjustment of said plates with respect to said direction,
   said motor means being operably connected with one of said sprocket wheels for each of said chains.

9. The structure defined in claim 8 wherein said links are U-shaped, the base portions thereof being secured respectively to the edges of said plates, the leg portions thereof being connected with the adjacent portions of their respective runs by said adjustment means.

10. The structure defined in claim 9 wherein said adjustment means comprises means forming threaded connections between said leg portions and said adjacent portions of said runs.

11. The structure defined in claim 10 wherein said threaded connections include bolts passing through openings in said legs.

12. The structure defined in claim 11 wherein said bolts are attached to the portions of said runs adjacent said legs and nuts are threaded onto the portions of said bolts extending through said openings.

13. The combination defined in claim 1 wherein said plates are disposed within a housing having side members which engage side portions of said plates and thereby laterally guide movement of said plates during their reciprocation,
   said side members having slots therein adjacent to and extending in the direction of movement of said plates.

a guide block secured to each side of each plate and projecting outwardly through the adjacent slot, guide rails mounted on the outer faces of said side members and guidably engaging said guide blocks, there being a pair of said sinuous elements, each of which is disposed outside of and adjacent to one of said side members, said runs being connected respectively with said guide blocks.

14. The structure defined in claim 13 wherein the weight of said plates is supported at least in part by the respective chain runs and in part by said guide rails.

References Cited
UNITED STATES PATENTS 3,168,190 2/1965 Nienstedt _____ 198—218
3,265,195 8/1966 Ford _____ 198—218

HUGO O. SCHULZ, Primary Examiner

U.S. Cl. X.R.

214—17